United States Patent [19]

Tamano

[11] 4,349,714
[45] Sep. 14, 1982

[54] APPARATUS FOR DEFROSTING FROZEN FOODS AND CONTINUOUSLY SUPPLYING SAME DEFROSTED

[76] Inventor: Tokuo Tamano, 148, Ikomadai, Ikoma-City, Naraken, Japan, 630-02

[21] Appl. No.: 177,967

[22] Filed: Aug. 14, 1980

[30] Foreign Application Priority Data

Aug. 11, 1979 [JP] Japan .................................. 54-102613

[51] Int. Cl.³ .............................................. H05B 6/80
[52] U.S. Cl. .............................. 219/10.55 A; 99/451; 219/10.55 R; 219/10.55 E
[58] Field of Search ................. 219/10.55 A, 10.55 M, 219/10.55 R, 10.55 F, 10.55 D, 10.55 E; 99/451, 339, 362, 367, 368, 478

[56] References Cited

U.S. PATENT DOCUMENTS

| | | | |
|---|---|---|---|
| 3,333,666 | 8/1967 | Murray et al. | 219/10.55 R |
| 3,381,605 | 5/1968 | Smith | 219/10.55 R X |
| 3,386,550 | 6/1968 | Murray et al. | 219/10.55 R |
| 3,416,429 | 12/1968 | Torsiello et al. | 219/10.55 R |
| 3,422,239 | 1/1969 | Ojelid | 219/10.55 A |
| 3,443,509 | 5/1969 | Sandy | 219/10.55 R |
| 3,482,509 | 12/1969 | Gardner | 219/10.55 R |
| 3,534,676 | 10/1970 | Rubino | 219/10.55 R |
| 3,972,277 | 8/1976 | Tamano | 99/451 |
| 4,198,555 | 4/1980 | Bellavoine | 219/10.55 R |

*Primary Examiner*—Arthur T. Grimley
*Attorney, Agent, or Firm*—William A. Drucker

[57] ABSTRACT

An apparatus for storing and then defrosting frozen food has a first cabinet with trays of food on a conveyor to which food from the first-mentioned trays is transferred for individual defrosting, and a pair of removable members in the second cabinet for forming an enclosure about a tray therein while the food thereon is irradiated with microwaves, the tray with the defrosted food thereon being thereafter moved to a dispensing opening of the second cabinet.

4 Claims, 6 Drawing Figures

APPARATUS FOR DEFROSTING FROZEN FOODS AND CONTINUOUSLY SUPPLYING SAME DEFROSTED

SUMMARY OF THE INVENTION

This invention relates to an apparatus for defrosting frozen foods and continuously supplying the same defrosted, which comprises a defrosting machine and a stock room being juxtaposed thereto and automatically replenishing it with precooked frozen foods, and intends to provide a defrosting apparatus which refrigerates and preserves cooked foods such as stewed beef, boiled rice, curried rice, and others so as to be able to supply the consumer with them in the state just right for eating by continuously defrosting them to just the moderate degree.

BACKGROUND OF THE INVENTION

As the apparatus having the capability of defrosting frozen foods in general to supply them in the state just right for eating, there is already known the apparatus disclosed in (U.S. Pat. No. 3,972,277).

It is true that the apparatus according to the former contrivance by the inventor has in fact satisfied the efficiency required for supplying the consumers with cooked frozen foods while defrosting them in the gross simultaneously and continuously for the purpose of supplying precooked frozen foods by defrosting to the state good for eating to troops (land, sea, and air), schools, companies, or passengers on pleasure ships or ferry boats in a state of collective provision of meals, while the above-mentioned contrivance has had also a merit that the consumer has been permitted to choose his preference from among the variety of cooked foods in ordinary restaurants, unattended coin-operating lunch rooms, or cafeterias.

However, in this defrosting machine for frozen foods according to the U.S. Pat. No. 3,972,277, when a limited number of precooked frozen foods once filled in the machine was all out, there was no alternative but to replenish anew frozen foods thereinto with a man's help.

In contrast with this, the present invention contains some superior features such that it can preserve in a stock room in advance a necessary number of pre-cooked foods such as stewed beefs, beefsteaks, hamburger steaks, pot-steamed hotchpotchs, sushi (vinegared fish and rice), tempura (Japanese deep-fat fried food), boiled rice, rice balls, and the like with maintenance of their sanitary conditions to prevent their deterioration in quality such as the degeneration reaction etc.; and that it is always filled up with frozen foods in the necessary number by being automatically replenished in proportion to the number having gone out one by one, whereby the cooked food suited for the taste of the consumer may be selectively offered through the provision of this defrosting apparatus according to the present invention in specific places such as troops (land, sea, and air), schools, companies, or for passengers on pleasure ships and ferry boats, and visitors staying in hotels, and further in unattended restaurants ordinary restaurants or coin-operated restaurants, for use in the collective provision of meals. In this way it became possible to provide a type of defrosting apparatus which requires no refilling with precooked frozen foods freshly for a given period of time.

To sum up, as compared with the device disclosed in U.S. Pat. No. 3,972,277, the present invention can be said to be one that has succeeded in promoting the economizing of manpower by using defrosting apparatus the collective provision of meals in troops, corporations, schools, pleasure ships and the like, or else as the defrosting apparatus used in various kinds of restaurants.

Furthermore, it becomes possible to supply every sort and kind of defrosted cooked foods as desired, when arranging a necessary number of defrosting apparatuses according to the present invention in a row and filling up each of them with one kind of the respective precooked foods such as stewed beef, beef-steak, sushi (vinegared fish and rice), chawanmushi (pot-steamed hotchpotch), and others.

What is more, if using the defrosting apparatuses according to the present invention, it is possible to supply a variety of foods at their desired temperatures just right for eating no matter whether a lower temperature is required as in the case of sushi, salads and the like, or a higher temperature is necessary as in the case of stewed beefs, chawanmushi (pot-steamed hotchpotch), and others.

The invention of this defrosting apparatus will enable the development of a chain store system of unattended restaurants if only a certain mechanism for producing, collecting, and delivering cooked foods took strong root.

DETAILED DESCRIPTION OF THE INVENTION

Description will be now directed to an example of an apparatus for continuously supplying foods according to the present invention with reference to the accompanying drawings.

Figure 1:
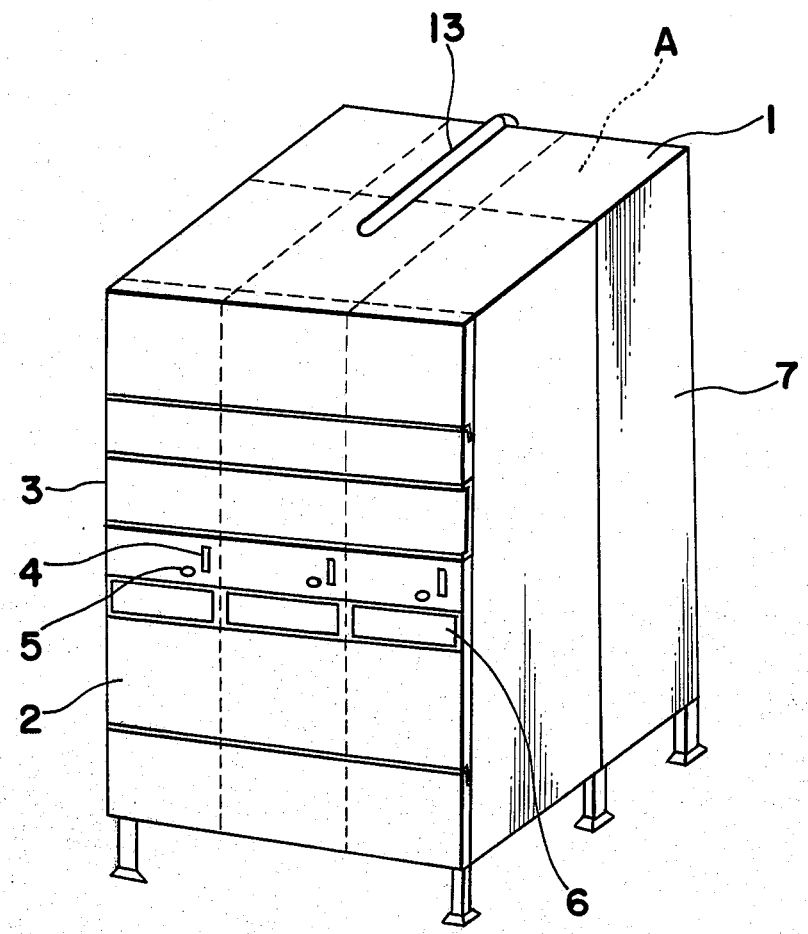
FIG. 1 is the outer appearance of an apparatus according to the present invention.

In FIG. 1, reference numeral (1) indicates an adiabatic shed surrounding a defrosting machine that comprises said supplying apparatus, which shed is formed of, for example, polycarbonate resin, glass fibre resin, or special steel such as stainless steel and the like.

Reference numeral (2) indicates a frontal door able to be opened and closed at will, which has a look-through window (3) provided at need, a coin slot (4) provided at need, an operating button (5) for taking out foods provided at need, and an automatic door (6) for taking out foods provided at need.

Reference numeral (7) indicates a door for filling up foods into a stock room (8) being provided by the side of the machine body.

The automatic door (6) for taking out foods and the door (7) for filling up foods both are of a double-window structure so as to be able to keep the air-tight state.

In FIG. 1, the apparatus is made in a three-set type so that three kinds of foods can be supplied at one machine. But when a wider variety of foods are desired to be sold, then the apparatus may be constructed in the so many-set type.

Figure 2:
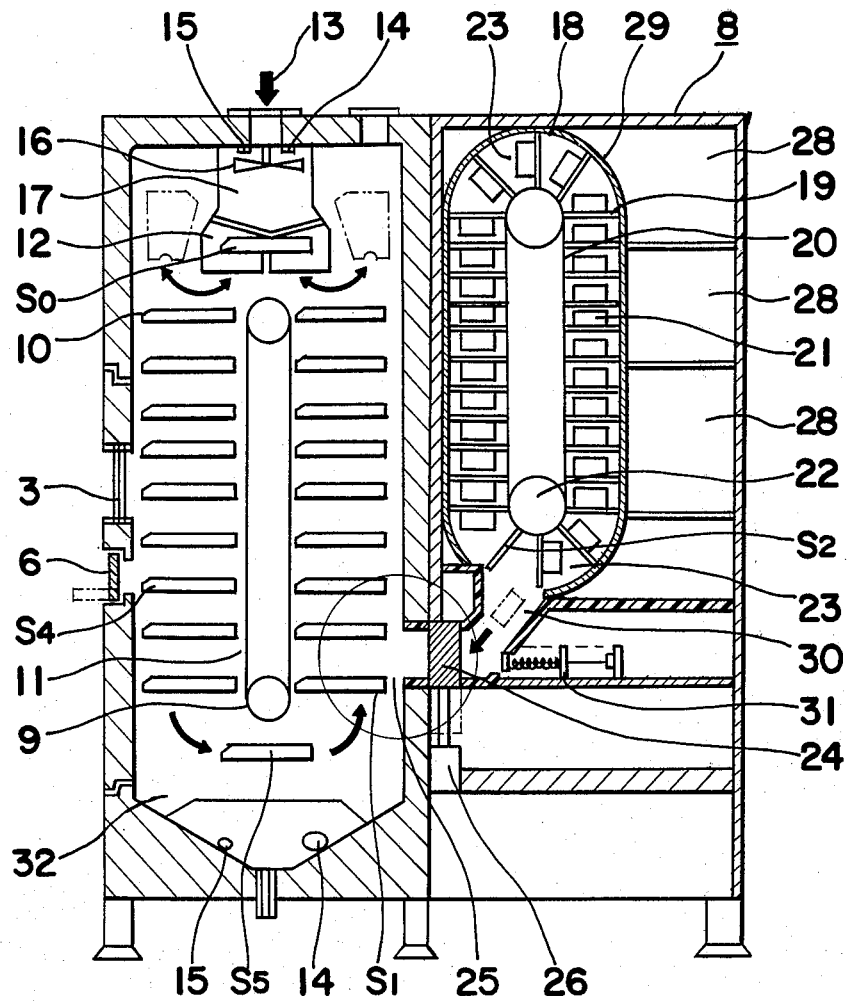
FIG. 2 (A) and (B) are cross-sectional views of the interior of the apparatus of FIG. 1, as a whole and in part, respectively.
Figure 2:
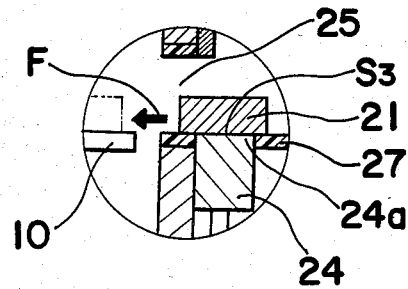

Taking hereinafter the one set-type A as an example, description is now directed to the internal construction of the apparatus with reference to FIG. 2 (A) and (B).

Reference numeral (9) indicates a pair of driving shafts or sprockets which are provided separately above and below in order to rhythmically drive and circulate an endless conveying member (11) consisting of a belt or chain whereto a required number of trays (10) are attached. Reference numeral (12) indicates an irradiation chamber cover able to be opened and closed at will which incorporates a magnetron irradiation device (13) a thermal conduction heating source (14) composed of a gas burner, a steam or cooled air blower pipe (15), a stirrer (16), and an irradiation chamber (17). This stirrer serves to prevent the occurrence of the unevenness in temperature of foods, thereby keeping them to the temperature good for eating. When a great quantity of foods are defrosted in the gross to make them eatable, another gas burner (14) and another steam or cooled air blower pipe (15) both being provided separately at the bottom of the machine are to be used; while on the other hand only the cooled air blower pipes (15, 15) are used in the case of bringing some kinds of foods, such as hiyamen (cold noodles) and the like, whose temperature just right for eating is lower, into an eatable state.

Reference numeral (18) is a defroster of the stock room (8). In this defroster (18), a plurality of metal plates (19) are fixedly attached to an endless belt (20). Even if foods, which each were placed on these metal plates (19) in the stratum, became icebound and congealed with one another, the mutual solidification of foods or their packages is easy to be physically separated since the cohered metal plates come to expand sector-formedly when foods pass along the peripherical region (23) of the driving shaft (22).

Reference numeral (24) indicates a door which serves to open and close a window (25) for sending out foods. The up-and-down movement of this door (24) is operated by an electric or hydraulic piston (26). At the time of the door (24) having come down, its upper end face (24a) is on the same level with a receiving stand (27) later stated (See FIG. 2 (B).

If necessary, some kind of metal plate (not shown in the figure) of excellent thermal conductivity, for example, such as aluminum sheet may be stuck on the upper end face of the food-receiving stand (27) which forms the lower frame of the window (25) for sending out foods. On this metal plate is provided a certain kind of heating mechanism so as to defrost only the surface of frozen foods, thereby the frictional resistance being able to be lowered at the time of transfer of foods.

The antifreezing device (18) and an auxiliary storage chamber (28) are separated by an adiabatic cover (29) within the stock room (8), while it is only a passage (30) and the foregoing device (18) that are constructed on the same level of air tightness.

Both the antifreezing device (18) and the auxiliary storage chamber (28) may be set to a cold-storage state by sending cooled air of a required temperature for a separately built-in cooling means (not shown in the figure), or they may be also brought into a freezing state by further lowering the temperature.

Reference numeral (31) indicates a solenoid valve-type device for pushing-out foods which is provided by the side of the passage (30). As shown in FIG. 2 (B), when one of the foods (21) in the antifreezing device (18) reaches the position $S_2$, it falls by its empty, dead weight through the passage (30) on the receiving stand (27). Then the above device (31) adds the pushing-out force (F) to this fallen food to mount it on the tray (10) in the position $S_1$.

In this connection, the rhythmic movement of the conveying belt in the antifreezing device (18), the up-and-down motion of the door (24), the movement of the device for pushing-out foods (31) and the automatic door (6) are set each other adjusting to the position $S_0$ of the tray in the irradiation chamber (17) as the starting point, for the purpose of inducing these three movements to interlock among them, in the course of which timers (not shown in the figure) are put in operation so as to secure the required time lag.

By way of example, the automatic door (6) opens after the tray (10) has shifted from $S_0$ up to $S_4$ with the point 0 in the irradiation chamber (17) as the starting point, at the same time when the antifreezing device (18) moves rhythmically to drop one piece of food (21) on the passage (30) after the above referred-to shifting time from $S_0$ to $S_4$.

The door (24) of the window for sending out foods (25) opens after the shifting time of the tray from $S_0$ to $S_5$ by the descent of the piston (26), while the device for pushing out foods (31) moves rhythmically after the shifting time of the tray from $S_0$ to $S_1$.

After having worked for the optional setting time required, all these devices are restored to the original state and put in readiness for the next motion.

In the apparatus thus constructed, foods first are loaded on all of trays (10) and also are filled up in the stock room (8) preparatorily to the replenishment.

The interior of the stock room (8) is controlled and always is kept cool in the freezing state between about $-18°$ C. and $-30°$ C. so as not to give rise to the deteriorative change of foods. On the other hand, a defrosting section (32) of the food supplying part of the machine makes the interior of the system be in the cold storage state during the summer season by sending thereinto the cooled air of about 0° to 10° C. correspondingly to the kinds of foods, for example, such as cooled noodles and the like, through the blower pipe (15), if necessary, thereby keeping the sanitary state of the machine. On the contrary, such as the box lunches containing boiled rice can be kept in the hot storage state maintaining at the temperatures between about 60°-80° C. in response to their eatable condition by sending heated vapor through the blower pipe (15).

For preserving foods, whether by keeping them cool by freezing or cold storing, or by hot storing, it is desirable to keep foods in an oxygen-free atmosphere, either by reutilizing liquid nitrogen gas or carbonic acid gas already previously used as a refrigerant, or by introducing fresh liquid nitrogen gas or carbonic acid gas that has not already been used, or inert gases such as from dry ice, in a part of the adiabatic shed (1) and the stock room (8), and further by mounting over the adiabatic shed (1) and the stock room (8) aerated bags which are filled with deoxydising agent such as sodium dithionite alone or with alkaline agent such as potassium hydroxide or calcium hydroxide, or other substance having a deoxydising effect, for example suboxides or iron.

The reason for saying as above lies in the fact that although there was so far a weak point that there was liable to be created the degenerative reaction (oxidative putrefying phenomenon) within the adiabatic shed (1) and the stock room (8) during the cold storing and the freezing, not to speak of the hot storing, by the contact of foods with oxygen originating from the oxygen contained within both the air and the foods themselves, the pouring of the inert gas and deoxidizing agent into both the adiabatic shed (1) and the stock room (8) has enabled foods to be prevented from their degenerative reaction through the cooperation of the expulsion of oxygen out of the adiabatic shed (1) and the stock room (8) by the liquid-air expansion of the inert gas jointly with the removal of the residual oxygen by the deoxidizing agent.

The working and effect of our apparatus for continuously supplying foods is as described above, so that it becomes possible to supply the consumer with the food maintaining the high degree of freshness for a long period of time.

Hereupon, a question arises as to which to be selected, the individually defrosting system operated by means of a push button when the consumer wishes to eat at his free time, or the mass defrosting system put in use for the provision of collective meals and the like.

This selection has a fundamental meaning important to the decision of the working and construction of the apparatus. There is a difference between the mass defrosting system and the individually defrosting system as follows:

In the former, the endless conveying belt (11) runs continuously, while, in the latter, the conveying belt must come to a stop once after it has finished the one-time shifting from $S_0$ up to $S_1$.

What is more, in the mass defrosting system, the irradiation chamber cover (12) opens and closes to defrost foods one by one every time when each of trays (10) passes there and provides all foods in a state just right for eating; whereas, in the individually defrosting system, the cover (12) opens and closes to defrost only one food on the tray (10) coming to the position $S_0$ without the defrosting function being applied to the remaining foods which continue to circulate intact around the circulating system within the adiabatic shed (1).

What the words "the complex defrosting-heating system" means in this specification is the one that has been discovered and theorized by the author of the present invention for the first time in the world.

In the frozen foods, the cellular fluid in the cell of animals and plants constituting the foods is ice-crystalized. Generally speaking, at the time of freezing the foods, the ice crystals are easy to be formed in the greatest quantities at the temperature zone of 31° to 25° F. This temperature zone is called the zone of maximum crystal formation. Within this zone is strong the bonding force of the ice crystal lattice.

When defrosting the frozen foods, there comes into question most the speed at which the defrosting reaction runs.

In the case of this speed being slow, the ice crystals of the big shape are produced in the muscular tissue of the edible animal, which causes the muscular tissue to degenerate and the outflow of its drip to increase, thereby leading to the spoilage of the taste of the frozen foods.

At the time of defrosting the frozen foods, however, it is insufficient to apply to the frozen foods solely the thermal conduction heating as with the use of steam and/or electric heat for the purpose of forcing the defrosting reaction to pass through the above-mentioned temperature zone at high speed.

Figure 3:
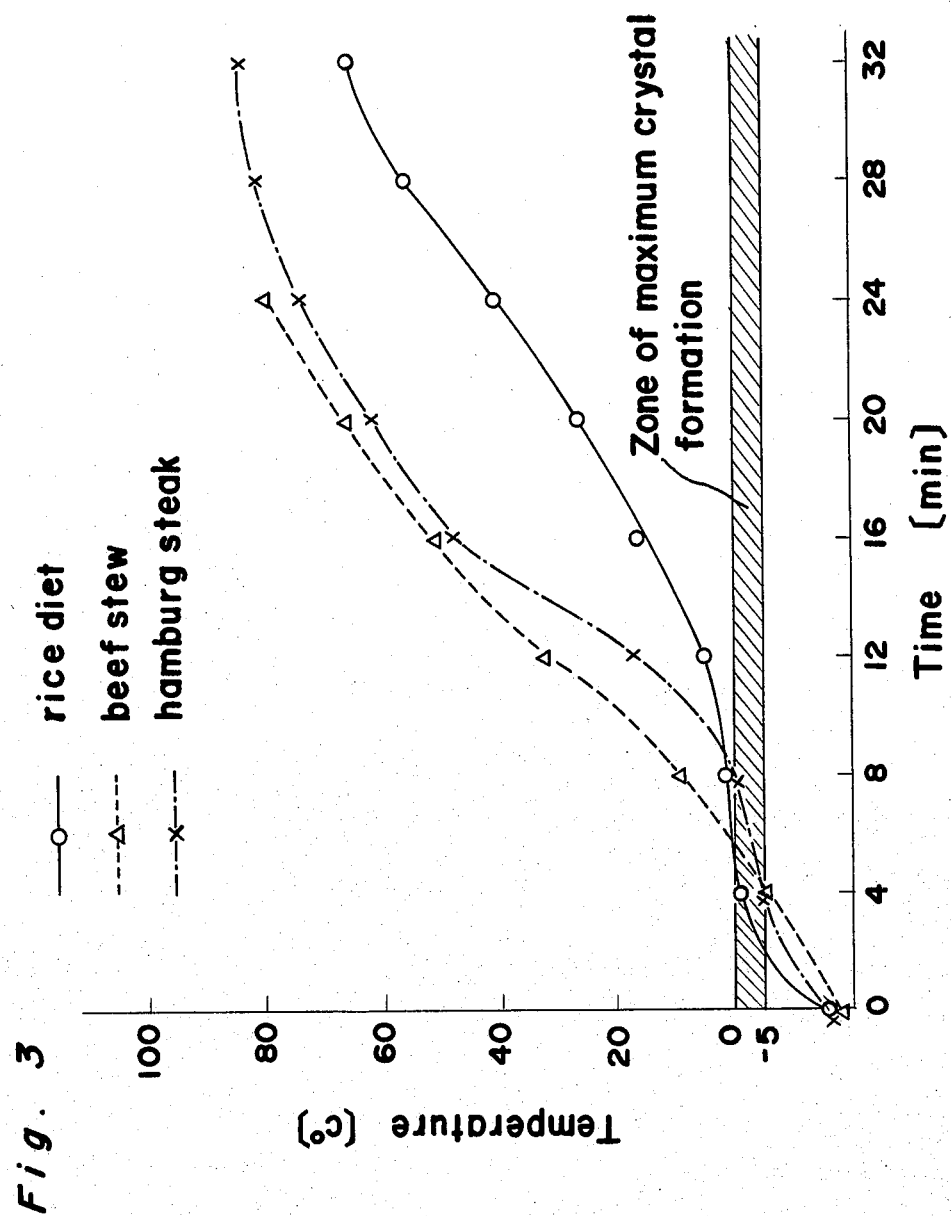
FIG. 3 is a graph representing a change with the passage of time in the temperature rise of frozen foods owing to the thermal conduction heating.

This fact also was made clear by the experimental acquisition of knowledge of the author of the present invention; that is to say, (A) FIG. 3 graphed the change with the passage of time of temperature of the three frozen foods: cooked frozen boiled rice (rice diet), stewed beef (beef stew), and hamburger steak (hamburg steak), used in the experimentation of the present invention, where these three frozen foods were heated by the use of oven (thermal conduction heating) at the temperature of 180° C.

Figure 4:
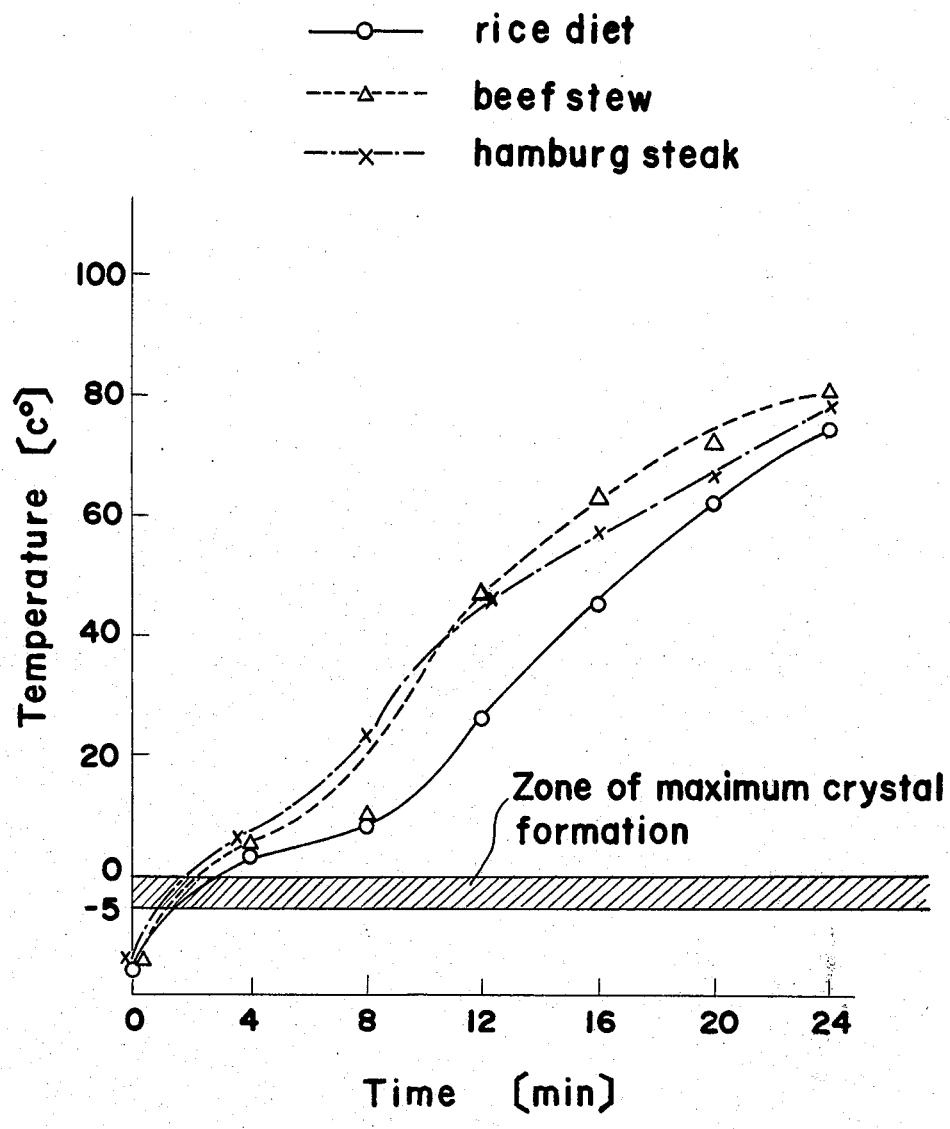
FIG. 4 is a graph representing a change with the passage of time in the temperature rise of frozen foods owing to the similar thermal conduction heating.

(B) FIG. 4 graphed the change with the passage of time of temperature of the same frozen foods as in FIG. 3, where they were heated by oven at the temperature of 180° C. while the steam heating was jointly used at the temperature of 180° C. cooperatively (both thermal conduction heating).

Figure 5:
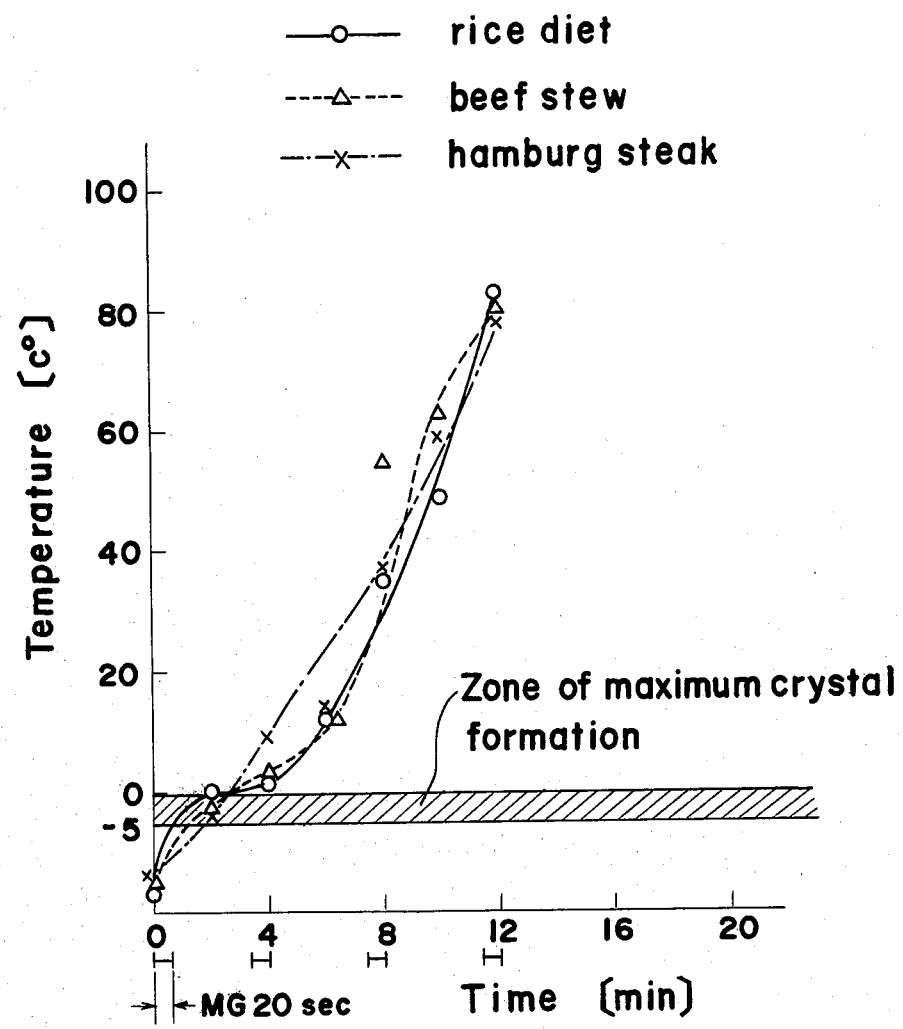
FIG. 5 is a graph representing a change with the passage of time in the temperature rise of frozen foods owing to the complex heating.

(C) FIG. 5 graphed the change with the passage of time of temperature of the same frozen foods as in FIG. 3, where they were irradiated by the microwave output 2.5 KW for 20 min. (MG 20 sec.) to which the oven and steam heatings also were added on the same condition as in (B). Thus the triple cooperation of these three heating systems was conducted at the same time.

As seen in FIG. 3 and 4, the time required to pass through the maximum ice crystal zone for the frozen food heated solely by the thermal conduction heating is longer than the time required to pass through the maximum ice crystal formation zone for the frozen food heated by the complex heating in FIG. 5.

The experimental acquisition of knowledge and the theory of the science on crystal lattice inspired the author of this invention so as to be able to reach this new complex heating system, whereby the rapid and uniform defrosting speed of the frozen foods passing through the maximum ice crystal formation zone can be attained for the first time by using the dielectric internal heating (microwave) jointly with the other two thermal conduction heatings.

As mentioned above, if based on the present invention, any preparatory defrosting atmosphere of either cold or hot storing can be created in the system of the defrosting section (32) correspondingly to the species of foods. Besides, in the case of the mass defrosting system, the temperature in the interior of the system may be set to an atmosphere of the temperature is made just right for eating by rendering the irradiation chamber cover (12) open at all times whereby the steam is blown thereinto from the blower pipe (15), and simultaneously by actuating also the gas burner (14), thereby all foods in the whole system being mass-defrosted in the gross.

Now, on pushing the operating button of the apparatus food as desired can be delivered to the consumer from the automatic door individually or in large quantities dependently on the construction and number of the defrosting systems. Since the emptied tray (10) having come to the position $S_1$ is at once replenished with the new food, thus the interior of the defrosting section (32) comes to be always full of the trays being mounted on with foods.

As particularly described in the above, the apparatus for continuously supplying foods, which has the ability of freezing and defrosting according to the present invention, is so constructed as to be able to perform the complex defrosting function by employing the steam and thermal conduction heating, and magnetron (dielectric internal heating), all devised formerly by the author of the present invention, so that it enables the provision of various lunch boxes containing boiled rice which was impossible to be supplied because of the propagation of sundry germs or the occurrence of the unevenness in temperature suitable for eating. It can be said as a conclusion that this is evidently the ideal defrosting apparatus able to continuously supplying foods at a proper temperature for eating, which has the effect of continuously performing the mass defrosting or the selective defrosting at will, and further of being able to supply various kind of foods, because of the stock room for freezing foods being juxtaposed to the defrosting section.

What is claimed is:

1. An apparatus for storing and then defrosting frozen items comprising:
    a first cabinet having a plurality of trays on an endless conveyor for individually supporting frozen food items and maintained at a food freezing temperature,
    a second cabinet adjacent the first cabinet in which frozen foods items are individually defrosted and supporting therein a plurality of trays on an endless conveyor,
    means for transferring food items from a tray in the first cabinet directly to a tray in the second cabinet,
    means for moving the conveyor in the second cabinet to position the tray with the transferred items at a predetermined location in the second cabinet,
    means in said second cabinet comprising a pair of removable members for forming an enclosure about a tray at said predetermined location,
    means for irradiating with microwaves the food items on a tray within said enclosure,
    means for moving the tray with the defrosted food item to a dispensing opening in said second cabinet.

2. The apparatus of claim 1 including means in addition to the microwave source for simultaneously defrosting the food item within the enclosure and comprising a thermal conducting source and steam.

3. The apparatus of claim 1 wherein the conveyors in the first and second cabinets are intermittently moved simultaneously.

4. The apparatus of claim 1 wherein the first cabinet is provided with two compartments, one compartment forming a storeroom for frozen food items and the other compartment containing the endless conveyor.

* * * * *